(12) United States Patent
Ohkawa et al.

(10) Patent No.: US 6,216,950 B1
(45) Date of Patent: *Apr. 17, 2001

(54) OPTICAL SCANNING APPARATUS

(75) Inventors: Masanori Ohkawa; Toshiyuki Ichikawa; Hiroshi Watanuki; Kozo Yamazaki, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,120

(22) Filed: Mar. 20, 1998

(30) Foreign Application Priority Data

Sep. 30, 1997 (JP) .................................... 9-267264

(51) Int. Cl.$^7$ .................................... G02B 26/00
(52) U.S. Cl. .................. 235/462.4; 235/472; 359/196
(58) Field of Search .................. 235/462.4, 462.39, 235/462.38, 467, 462.34, 462.35, 472; 359/196

(56) References Cited

U.S. PATENT DOCUMENTS

| | | | |
|---|---|---|---|
| 5,140,141 | 8/1992 | Inagaki et al. | 235/462 |
| 5,206,491 | 4/1993 | Katoh et al. | 235/467 |
| 5,216,232 | 6/1993 | Knowles et al. | 235/467 |
| 5,229,588 | 7/1993 | Detwiler et al. | 235/467 |
| 5,705,802 | * 1/1998 | Bobba et al. | 235/467 |
| 5,801,370 | * 9/1998 | Katoh et al. | 235/467 |

FOREIGN PATENT DOCUMENTS

| | | |
|---|---|---|
| 0772147 | 5/1997 | (EP) . |
| 0779951 | 6/1997 | (EP) . |
| 6-3192175 | 8/1998 | (EP) . |
| 2284086 | 5/1995 | (GB) . |
| 6-28508 | * 2/1994 | (JP) . |
| 8-241368 | * 9/1996 | (JP) . |
| 63-192175 | 8/1998 | (JP) . |

OTHER PUBLICATIONS

U.S. application No. 08/622,188, filed Feb. 28, 1991, Katoh et al.
U.S. application No. 08/950,130, filed Sep. 24,1992, Katoh et al.
U.S. application No. 08/206,260, filed Mar. 7, 1994, Katoh et al.
U.S. application No. 08/446,267, filed May 22, 1995, Katoh et al.
U.S. application No. 08/701,065, filed Aug. 21, 1996, Katoh et al.

* cited by examiner

Primary Examiner—Thien M. Le
Assistant Examiner—Daniel S. Felten
(74) Attorney, Agent, or Firm—Staas & Halsey LLP (57) ABSTRACT

An optical scanning apparatus which reduces operator workload at a checkout counter and configured to be inexpensive to manufacture. In particular this optical scanning apparatus is designed so that an operator can scan merchandise without tilting these commodities. Therefore, to use this optical scanning apparatus the operator spots the bar code and slides the merchandise along the checkout counter. The optical scanning apparatus emits laser scanning patterns from the side of the counter and parallel to its surface as well as from above. Therefore whether the bar code is located on the side or top of the merchandise the apparatus is able to read it without tilting the merchandise. This is particular useful when dealing with liquid products, such as beverages or soups, and delicate products, such as cakes. In the case of liquid products, tilting them would run the risk of spilling them on the counter. In the case of delicate products, tilting them runs the risk of disturbing their appearance. The optical scanning apparatus is also designed to have a low profile and thus not act as an obstruction to operator's vision or movement of merchandise to be scanned.

18 Claims, 8 Drawing Sheets

OPTICAL SCANNING APPARATUS

CROSS-REFERENCE TO RELATED APPLICATIONS

This application is based upon and claims priority of a Japanese Patent Application No. 9-267264 filed Sep. 30, 1997, the contents of which are incorporated herein by reference.

BACKGROUND OF THE INVENTION

1. Field of the Invention

The present invention relates to an optical scanning apparatus, and, more particularly, the present invention relates to an optical scanning apparatus including a bar code reader used in a point-of-sale (hereinafter "POS") system capable of reading the bar code information attached to commodities and performing check-out functions.

2. Description of the Related Art

In recent years, the use of the POS systems capable of performing the check-out functions by reading the bar code information attached to commodities has become widely available. These POS systems alleviate the load on operators by simply requiring the operator to handle the commodity at check-out so that the bar code is read by the scanner. The apparatus for reading this bar code information is referred to as a POS scanner or bar code scanner. The scanner portion of the POS scanner normally employs a laser beam and is attached to the checkout counter.

Conventionally, the scanner is configured so that a single reading window is installed horizontally on the counter surface. However, recent trends in POS scanner design have employed two distinct designs which were developed to meet customer demands. The first has found significant acceptance especially in the United States and uses a multi-head scanner having glass windows located on both the side and the bottom of the apparatus from which laser beams are emitted in order to read the bar codes. Using this design the operator's workload is even further reduced since either the scanner embedded in the counter surface reads the bar code or the side scanner reads the bar code.

In Japan and Europe the demand for cheaper scanners exists and the high-performance scanner described above using two reading windows have generally not been used. Instead, the conventional POS scanner apparatus is installed in a vertical position with respect to the counter and thereby enabling the smooth movement of commodity packages. However, user demand for an even less costly scanner which is easier to use always exists.

Commodities packaged and arranged in stores include liquid items, such as beverages and soups, as well as fragile commodities, such as cakes. If these types of commodities are tilted when scanning the bar code, the risk exists that the liquid would spill and smear the check-out counter or the commodities are deformed which would adversely affect their appearance.

All the conventional POS scanning devices in the prior art have the problem of requiring tilting commodities being scanned. In addition, the vertically-installed scanner used in Japan and Europe uses only one reading window and therefore the range of bar code orientation allowed for reading is limited.

In the conventional apparatus having reading windows in both the counter surface and the front thereof, the scanner acts as an obstruction to the movement of commodity packages. Therefore, this apparatus has rarely been introduced in the stores in Japan. In all of the conventional POS scanners, the operator must place the bar code surface toward the window face. Therefore, the operator is unable to handle the commodities while watching the bar code.

Figure 8A:
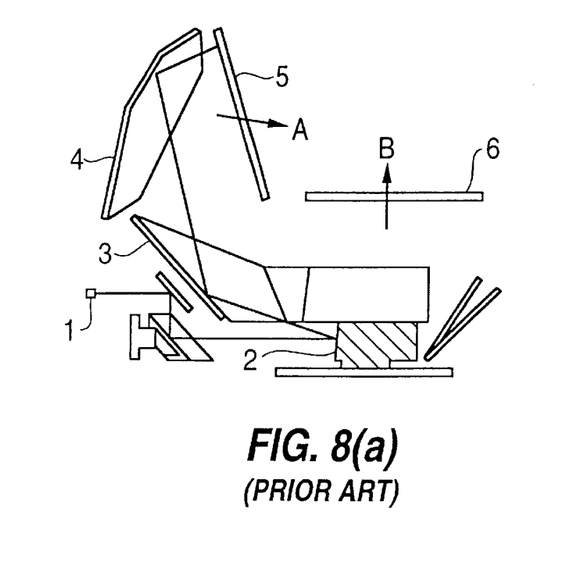
FIG. 8(a) is a diagram showing an example of a conventional optical scanning apparatus in the prior art.

FIG. 8(a) is a diagram showing an optical scanning apparatus disclosed in U.S. Pat. No. 5,229,588 as an example of a conventional optical scanning apparatus. This apparatus is so designed that the laser beam emitted from a laser light source 1 is scanned by a polygon shaped mirror 2 and reflected by mirrors 3 and 4 so that a laser scanning pattern A is emitted from a window 5 positioned substantially vertical thereto. At the same time, a laser scanning pattern B is emitted from a horizontal window 6 embedded in the counter surface through a mirror which is not shown in the diagram.

Figure 8B:
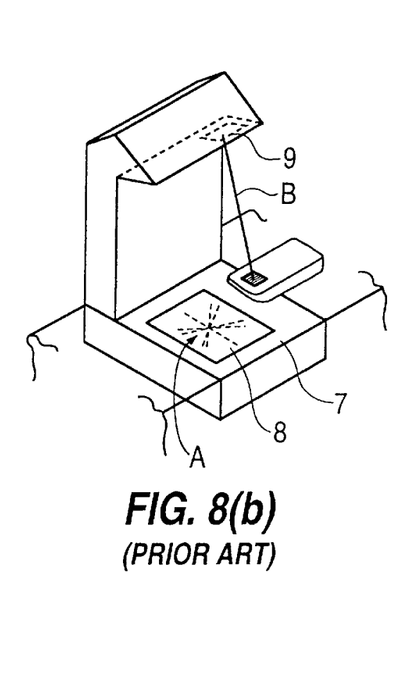
FIG. 8(b) is a diagram showing an example of a conventional optical scanning apparatus in the prior art.

Another POS scanner known in the art is shown in FIG. 8(b) as disclosed in JP-A-63-192175. This apparatus comprises a commodity sliding surface 7 and scanning windows 8 and 9. Window 8 is located on the commodity sliding surface of the counter and window 9 is located above the sliding surface. Laser scanning pattern A is emitted through window 9 and laser scanning pattern B is emitted through window 8.

Figure 8C:
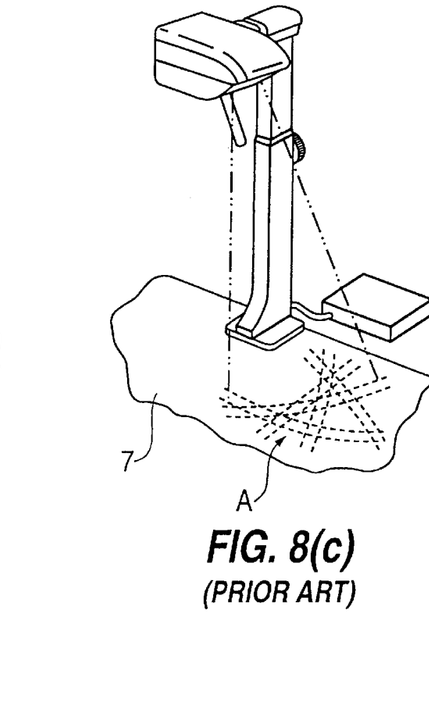
FIG. 8(c) is a diagram showing an example of a conventional optical scanning apparatus in the prior art.

A still further example of the conventional POS scanner is shown FIG. 8(c) as disclosed in U.S. Pat. No. 5,140,141. This apparatus comprises a reading window only above a commodity sliding surface 7 and is so configured that a laser scanning pattern A is emitted from the window.

Another example of a optical scanning apparatus (not shown in any drawing) is disclosed in U.S. Pat. No. 5,206,491. This apparatus comprises reading windows on two sides thereof, and the laser beam(s) emitted from these windows either using two laser light sources or one laser light source split into two portions by a beam splitter. The resulting two beams are read by the optical scanning apparatus.

Problems encountered in a conventional apparatus as disclosed by U.S. Pat. No. 5,229,588 exist due to the scanner section being located on the counter surface and forming an obstruction to the movement of commodity packages. Also, in order to scan a package, tilting the commodity is required which prevents the operator from viewing the bar code at the same time. Further, as shown in FIG. 8(a), although the laser beam entering the optical scanning device 2 from the laser light source 1 is substantially perpendicular to the rotational axis of the optical scanning device, scanning from the optical scanning device (in the direction toward the mirror 3 from the scanning device) is not perpendicular to the rotational axis but titled slightly upward. Under this configuration, if the scanning beam A reflected by the mirror 4 and emitted through the window 5 is to be scanned in the direction substantially parallel to the window 6, mirror 4 must be tilted to accomplish this. When the apparatus disclosed by U.S. Pat. No. 5,229,588 is installed vertically, the size of the upper optical section increases to the point that problems are encountered in use.

In the example of the conventional apparatus provided in JP-A-192175, the scanner section on the counter surface forms an obstacle to the movement of packaged commodities. In addition, the apparatus of JP-A-102175 having three sections including a counter surface, a side section and a top section, is complicated and expensive.

In the third example of the conventional apparatus shown in U.S. Pat. No. 5,140,141, several advantages are seen including: not requiring the tilting packaged commodities; the operation being possible while the operator watches the bar code; and that there is no obstruction to packaged commodity movement. However, a problem exists in that the laser beam is emitted only in one downward direction resulting in a narrow allowable legible angle of the orientation of the bar code. This problem can be alleviated by increasing the size of the device but would increase the cost of the support member for the scanner and would also adversely affect commodity handling. Therefore, the allowable size of the configuration of the apparatus is unavoidably limited.

The fourth example of conventional devices as disclosed in U.S. Pat. No. 5,206,491, the problem of high cost is encountered. This high cost is due to the configuration requiring two laser beams being emitted or one using a beam splitter to create two beams along with the two beams being introduced to the optical scanning device.

SUMMARY OF THE INVENTION

An object of the present invention is to provide a scanner capable of reducing operator workload using a low-cost configuration. More particularly, a further object of the present invention is to provide an optical scanning apparatus in which the operator can operate it without tilting packaged commodities, such as liquids, as exemplified by soups, and delicate items, such as cakes. Further, the invention is intended to provide a vertical double-face scanner as an optical scanning apparatus using a low-cost configuration comprising: a reading window in the side and another in the upper surface and having a wide legible range for reading bar codes while retaining the reading performance of the conventional side scanner so that smooth movement of packaged commodities is possible using a laser scanning pattern projected downward from an upper surface.

Objects and advantages of the present invention are achieved in accordance with embodiments of the present invention by an optical scanning apparatus mounted to a commodity sliding surface to read a bar code which comprises a laser light source to generate a laser beam, an optical scanning unit rotationally driven to reflect the laser beam in a plurality of directions, a light beam splitting unit to split the laser beam into a first laser beam and a second laser beam, a first light deflection unit to direct the first laser beam, a second light deflection unit to direct the second laser beam, a first reading aperture facing downward to a commodity sliding surface, and a second reading aperture facing perpendicular to the commodity sliding surface. The first light deflection unit emits a first laser scanning pattern through the first reading aperture in a downward direction perpendicular or diagonal to the commodity sliding surface. The second light deflection unit emits a second laser scanning pattern through the second reading aperture in a direction substantially parallel to the commodity sliding surface. A light signal focusing unit is used to focus light reflected by a bar code as a result of the first laser scanning pattern and the second laser scanning pattern striking the bar code. A light sensor unit then receives light from the light focusing unit and converts the light to electrical signals based on the reflected light from the bar code.

Further objects and advantages of the present invention are achieved in accordance with embodiments of the present invention by an optical scanning apparatus mounted to a commodity sliding surface for reading a bar code which comprises a laser light source to generate a laser beam, an optical scanning unit to direct the laser beam in a plurality of directions, a first reading aperture facing downward to a commodity sliding surface, and a second reading aperture facing perpendicular to the commodity sliding surface. A first laser scanning pattern is emitted by the optical scanning unit through the first reading aperture in a downward direction perpendicular or diagonal to the commodity sliding surface. A second laser scanning pattern emitted by the optical scanning unit through the second reading aperture in a direction substantially parallel to the commodity sliding surface. A light signal focusing unit is used to focus light reflected by a bar code, and a light sensor unit is used to detect the light focused by the light signal focusing unit.

Still further objects and advantages of the present invention are achieved in accordance with embodiments of the present invention by an optical scanning apparatus which comprises a laser light source, an optical scanning unit to direct light from the laser light source, a plurality of reading apertures, a first laser scanning pattern emitted in a downward direction perpendicular or diagonal to a commodity sliding surface by the optical scanning unit through the plurality of reading apertures, a second laser scanning pattern emitted substantially parallel to the commodity sliding surface by the optical scanning unit through the plurality of reading apertures, a light signal focusing unit to focus light reflected by an object, and a light sensor unit to detect light from the light signal focusing unit.

In accordance with embodiments of the present invention, the plurality of reading apertures include a first reading aperture and a second reading aperture. The first laser scanning pattern is emitted through the first reading aperture and the second laser scanning pattern is emitted through the second reading aperture.

In accordance with embodiments of the present invention, the optical scanning apparatus also includes: a first light deflection unit to direct scanning by the optical scanning unit to the first reading aperture; and a second light deflection unit to direct scanning to the second reading aperture.

In accordance with further embodiments of the present invention, the laser light source is a single laser light source. The optical scanning unit scans in a direction substantially perpendicular to the rotational axis of the optical scanning unit. The optical scanning unit also scans in a direction substantially parallel to the first reading aperture. A single laser beam enters the optical scanning unit. The light sensor unit is a single unit. Alternatively, a plurality of laser beams enter the optical scanning unit from the laser light source. These plurality of laser beams are alternatively generated by a plurality of laser light sources. Also alternatively, the plurality of laser light beams are generated by a laser beam splitting unit splitting the laser beam emitted from the laser light source.

In accordance with further embodiments of the present invention, the first reading aperture and said second reading aperture are positioned in a single plane of a housing enclosing the optical scanning apparatus. The first reading aperture and the second reading aperture alternatively are positioned in adjacent surfaces of a housing enclosing the optical scanning apparatus. When the first reading aperture and the second reading aperture are positioned in a single plane, the plane is diagonally positioned to the commodity sliding surface.

In accordance with still further embodiments of the present invention, the optical scanning apparatus further includes a housing having a bottom portion that may be installed horizontally on a commodity sliding surface. The second reading aperture is substantially perpendicular to a commodity sliding surface. The optical scanning unit emits a laser beam in a direction perpendicular to a commodity sliding surface on which the optical scanning apparatus is mounted. Also, the optical scanning unit emits a laser beam in a direction substantially parallel to a commodity sliding surface on which the optical scanning apparatus is mounted.

In accordance with further embodiments of the present invention, at least one of the first laser scanning pattern and the second laser scanning pattern is formed of a laser scanning beam directed in four directions. The second laser scanning pattern comprises a plurality of scanning lines emitted within an angular range not more than 20 degrees with respect to the direction in which commodities move on a commodity sliding surface. The first laser scanning pattern and the second laser scanning pattern are emitted from the first reading aperture and are separate when emitted from the first reading aperture but cross each other outside the optical scanning apparatus. Alternatively, the first laser scanning pattern and the second laser scanning pattern are emitted from the second reading aperture and are separate when emitted from the second reading aperture but cross each other outside the optical scanning apparatus.

In accordance with further embodiments of the present invention, the second laser scanning pattern comprises a laser scanning pattern generated only by a mirror arranged in the light path leading from the optical scanning unit to the second reading aperture. Alternatively, the second laser scanning pattern comprises a laser scanning pattern generated by three mirrors arranged in the light path leading from the optical scanning unit to the second reading aperture. Also, the first laser scanning pattern comprises two laser scanning lines emitted to be substantially perpendicular to each other, and the second laser scanning pattern comprises two laser scanning lines emitted to be substantially perpendicular to each other.

In accordance with further embodiments of the present invention, the optical scanning apparatus reads a bar code and includes: a laser light source to generate a laser beam; an optical scanning unit rotationally driven to reflect the laser beam in a plurality of directions; a light beam splitting unit to split the laser beam into a first laser beam and a second laser beam; a first light deflection unit to direct the first laser beam; a second light deflection unit to direct the second laser beam; a first reading aperture; and a second reading aperture substantially perpendicular to the first reading aperture. A first laser scanning pattern is emitted from the first reading aperture by the first light deflection unit in a downward direction. A second laser scanning pattern is emitted from the second reading aperture by the second light deflection unit which is substantially perpendicular to the first laser scanning pattern. A light signal focusing unit to focus light reflected by the bar code as a result of the first laser scanning pattern and the second laser scanning pattern striking the bar code. A light sensor unit receives light from the light focusing unit and converts the light to electrical signals based on the light reflected from the bar code.

In accordance with further embodiments of the present invention, the optical scanning apparatus is contained in an elongated vertical housing having an upper end and a lower end which is mounted to a commodity sliding surface to read a bar code. A laser light source is used to generate a laser beam. An optical scanning unit is rotationally driven by a drive motor to reflect the laser beam in a plurality of directions, in which the optical scanning unit and the drive motor are positioned in the lower end of the elongated vertical housing whereby a low center of gravity is provided in the lower end of the elongated vertical housing. A light beam splitting unit is provided to split the laser beam into a first laser beam and a second laser beam. A first light deflection unit is positioned to direct the first laser beam located in the upper end of the elongated vertical housing. A second light deflection unit is positioned to direct the second laser beam. A first reading aperture is positioned to face downward to the commodity sliding surface and is located in the upper end of the elongated vertical housing. A second reading aperture faces perpendicular to the commodity sliding surface. A first laser scanning pattern is emitted from the first reading aperture by the first light deflection unit in a downward direction perpendicular or diagonal to the commodity sliding surface. A second laser scanning pattern is emitted from the second reading aperture by the second light deflection unit in a direction substantially parallel to the commodity sliding surface. A light signal focusing unit is used to focus light reflected by the bar code as a result of the first laser scanning pattern and the second laser scanning pattern striking the bar code. A light sensor unit to receive light from the light focusing unit and convert the light to electrical signals based on the light reflected from the bar code.

BRIEF DESCRIPTION OF THE DRAWINGS

These and other objects and advantages of the invention will become apparent and more readily appreciated for the following description of the preferred embodiments, taken in conjunction with the accompanying drawings of which:

FIG. 1(*a*) is a diagram showing the first embodiment of the present invention, in which a cross-sectional view is taken in line a—a as provided in FIG. 1(*b*);

FIG. 1(*b*) is a diagram showing the first embodiment of the present invention, in which a cross-sectional view is taken in line b—b as provided in FIG. 1(*a*);

FIG. 3(*a*) is a diagram showing the second embodiment of the present invention, in which a side cross-sectional view is shown;

FIG. 3(*b*) is a diagram showing the second embodiment of the present invention, in which a perspective view as taken from the front is shown;

FIG. 3(*c*) is a diagram showing the second embodiment of the present invention, in which a perspective view as taken from the front is shown from an angle;

FIG. 3(*d*) is a diagram showing the second embodiment of the present invention, in which scanning patterns are shown on the commodity sliding surface;

FIG. 4(*a*) is a diagram showing the third embodiment of the present invention, in which is a side cross-sectional view is shown;

FIG. 4(*b*) is a diagram showing the third embodiment of the present invention, in which a perspective view is shown;

FIG. 4(*c*) is a diagram showing the third embodiment of the present invention, in which another perspective view is shown;

FIG. 4(*d*) is a diagram of the third embodiment of the present invention showing the scanning patterns on a commodity sliding surface;

FIG. 5(*a*) is a side cross-sectional view of the first, second and third embodiments of the present invention;

FIG. 5(*b*) is a side cross-sectional view of the fourth embodiment of the present invention;

FIG. 5(*c*) is a side cross-sectional view of the fifth embodiment of the present invention;

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1A:
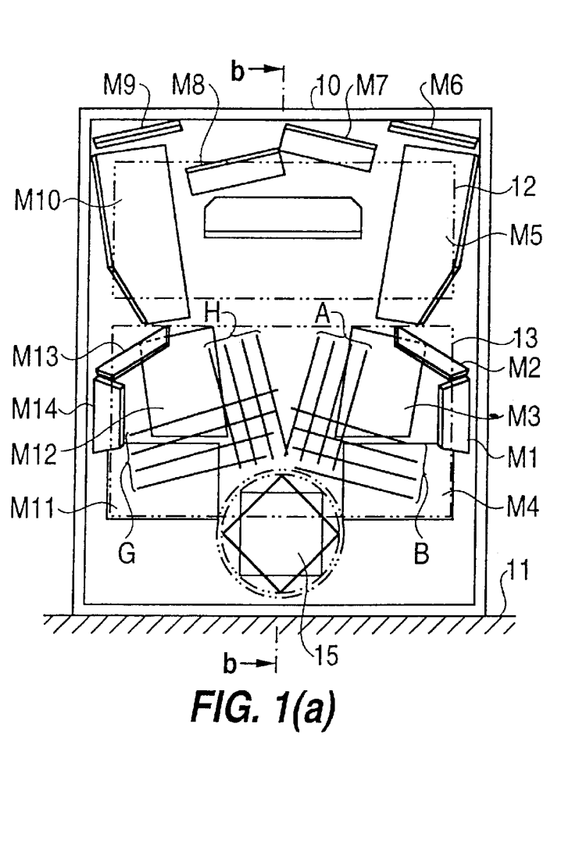
Figure 1B:
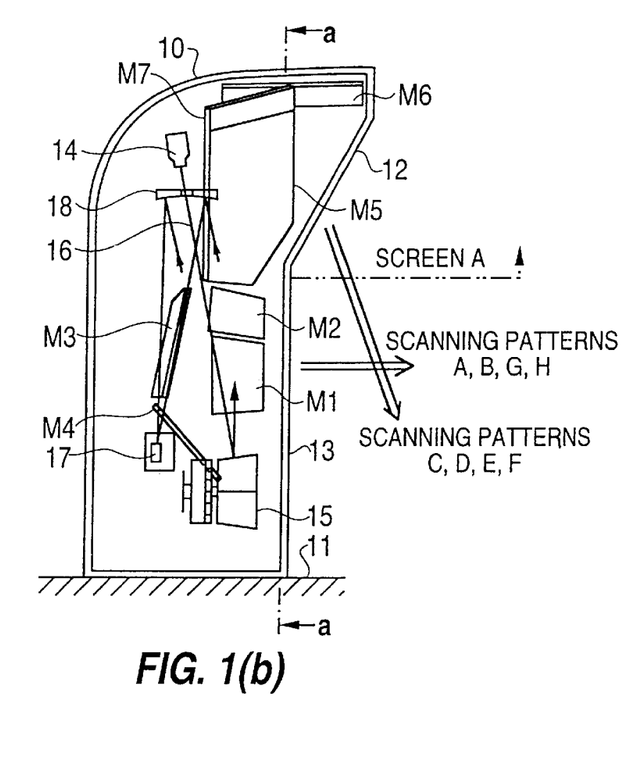
Figure 2:
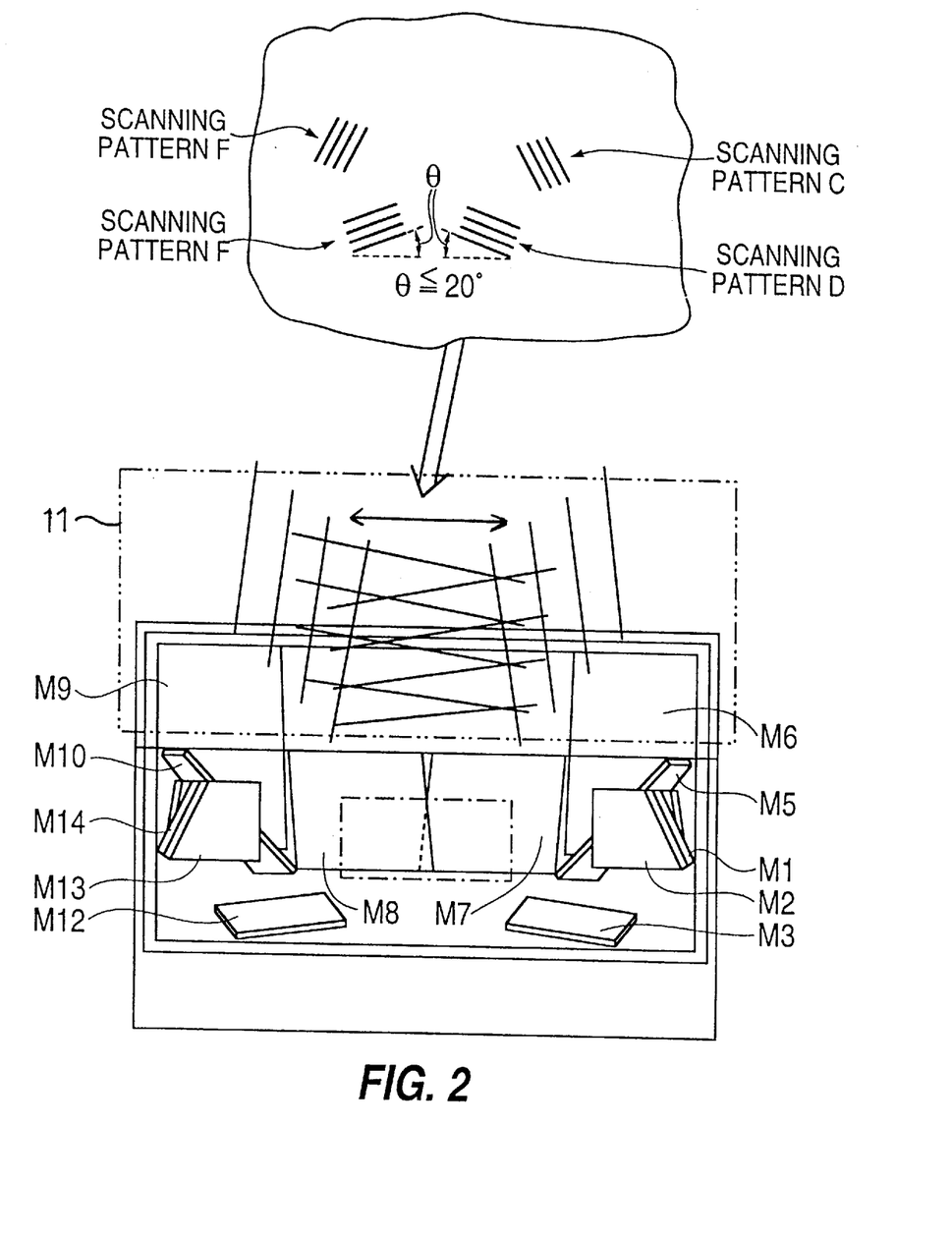
FIG. 2 is a diagram showing the first embodiment of the present invention, which shows scanning patterns on the screen A of FIG. 1(*b*), and also a top plan view showing scanning patterns on the commodity sliding surface.

FIGS. 1(a)–(b) and FIG. 2 are diagrams showing a first embodiment of the present invention. FIG. 1(a) is a cross-sectional view taken in line a—a in FIG. 1(b). FIG. 1(b) is a cross-sectional view taken in line b—b in FIG. 1(a). FIG. 2 is a view from below screen A in FIG. 1(a) showing the scanning patterns.

As shown in FIGS. 1(a)–(b), a housing 10 is a vertically long box member disposed on a counter 11 (commodity sliding surface) and has a second reading window (lower window or aperture) 13 in the lower side surface thereof and a tilted first reading window (upper window or aperture) 12 in the upper part thereof.

Housing 10 contains a single light source (semiconductor laser) 14 arranged in the upper part of housing 10, an optical scanning unit (polygon mirror) 15 arranged near the bottom of the lower part in the housing and driven by a motor, a first light deflection unit in the upper part of the housing and a second light deflection unit arranged at the right and left sides of the central portion of housing 10. A laser beam 16 emitted diagonally downward from the single light source (semiconductor laser) 14 is scanned substantially upward and to the right by an optical scanning unit 15. Part of the scanning beam is emitted from a first reading window 12 as scanning patterns C, D, E, and F by the first light deflection unit. The remaining portion of the scanning beam is emitted from a second reading window (aperture) 13 as scanning patterns A, B, G, and H by the second light deflection unit.

The first light deflection unit includes six mirrors, M5 through M10, in which mirrors 5 and 6 are symmetrical to mirrors 10 and 9, respectively, and mirror 7 is asymmetrical to mirror 8. The second light deflection unit includes eight mirrors in which two sets of four mirrors, M1 through M4 and M1 through M14, with mirror M1 symmetrical to M14, M2 symmetrical to M13, M3 symmetrical M12, and M4 symmetrical to M11. The lower reading window 13 (which is the side reading window, or second reading window) is formed perpendicular to the bottom of the housing 10, and the upper reading window 12 (which is the first reading window) is tilted with respect to the bottom of the housing 10. Numeral 17 designates a light sensor unit for reading signals, and the numeral 18 a concave mirror which acts as a light signal focusing unit to focus the light to the light sensor unit 17.

The operation of the first preferred embodiment will be explained in detail below. The laser beam 16 emitted from the laser light source 14 enters the polygon mirror 15 rotationally driven by a motor. In response to the rotational drive of the polygon mirror 15, the laser beam reflected by the polygon mirror 15 is sequentially directed toward scan mirrors M1, M2, M5, M7, M8, M10, M13, and M14, in that order. The scanning beam is split and reflected by the mirror M1 and is reflected from the mirror M3. The scanning beam is emitted to the outside of the present invention as a scanning pattern A through the second reading window 13.

In a similar fashion, the scanning lines are emitted to the outside of housing 10 through the following routes:

Scanning pattern B: via mirror M2—mirror M4—2nd window;

Scanning pattern C: via mirror M5—mirror—1st window;

Scanning pattern D: via mirror M7—1st window;

Scanning pattern E: via mirror M8—1st window;

Scanning pattern F: via mirror M10—mirror MS—1st window;

Scanning pattern G: via mirror M13—mirror M11—2nd window; and

Scanning pattern H: mirror M14—mirror M12—2nd window.

The laser beam is then reflected by the bar code while scattering and inversely follows the same route as the emitted laser beam up to the polygon mirror 15. The reflected laser beam is then condensed by the concave mirror 18 to focus at a light sensor 17. The difference of the signal light corresponding to the white and black bars of the bar code is converted into an electrical signal which is processed through a demodulation circuit.

In this first embodiment of the present invention, the laser scanning pattern is emitted downward from the first (top or upper) reading window 12. The operator can carry out the scanning operation without tilting the commodities in their packages while watching the bar code. Also, according to the first preferred embodiment of the present invention, the laser scanning pattern is emitted at substantially right angles to the top surface so that the reading of the scanner is independent of the rotational direction of the bar code plane. Also, laser scanning patterns of the same type are emitted from the right and left portions of the top portion of the present invention in such a manner as to cross each other in the reading space, thereby providing a wide allowable angle of rotational position of the commodities in the scanning area.

Since the laser scanning pattern from the second (side) reading window 13 is also emitted toward the front, the allowable reading angle for the bar code position is widened as mutually complemented laser scanning patterns from the top and the side scan the bar code. Thereby, by scanning from two directions, the operator workload is alleviated during the check-out procedure.

In the first preferred embodiment of the present invention, generation of the scanning pattern D or E is realized by a single mirror M7 or M8 arranged in the light path leading from the optical scanning unit to the reading aperture. The present embodiment thus eliminates the problems encountered in an optical system for generating the scanning patterns by two or more mirrors in which the longitudinal size of the apparatus is increased, or the top scanner expands considerably, thereby adversely affecting the face-to-face position between the operator and the customer or making scanning more difficult.

Also, according to the first preferred embodiment of the present invention, scanning from the optical scanning unit is substantially perpendicular to the rotational axis (in the direction of scanning from the optical scanning unit 15 to the mirror M7 in FIG. 1(b)) and substantially parallel to reading window 13. The desired scanning pattern can thus be supplied outside the device through window 12 without tilting the mirror M7 considerably. The advantage of the present embodiment is that the short depth thereof and the small expansion of the uppermost optical system, as compared with the conventional apparatus shown in FIG. 8(a), improves the face-to-face relationship with the operator.

In the scanning patterns D and E according to the first preferred embodiment of the present invention, as shown in FIG. 2, the direction of commodity movement, as indicated by the double headed arrow, and the scanning lines cross each other at an angle θ not more than 20 degrees in a plane parallel with the counter surface (commodity sliding surface) 11. Also, the asymmetry between the mirrors M7 and M8 causes the scanning patterns D and E to cross each other not at the center but at right and left sides. Many stores now internally print their own bar codes, and the majority of these bar codes are low in height. An attempt to scan each low-height bar code from end to end would require the direction of commodity movement and the scanning line to cross each other at an angle of 20 degrees or less. In the case where the scanning line and the direction of commodity movement cross each other at an angle of more than 20 degrees, the operator is inconveniently required to scan the commodities (with the bar code thereof attached in store) while rotating them. According to the first preferred embodiment of the present invention, the angle of crossing is not more than 20 degrees and the scanning patterns D and E cross each other not at the center but at right and left sides thus eliminating any blank portions. Therefore, scanning is made possible without rotating the commodities in the scanning area of the counter.

The first preferred embodiment of the present invention, refers to the optical scanning unit 15 as a polygon with four facets, and therefore four scanning lines of the same type are emitted per rotation of the polygon. With a three-facet polygon, the increased scanning angle of the optical scanning unit leads to the advantage of an increased length of each scanning line. However, three scanning lines constitute each scanning pattern per rotation of the polygon mirror with three facets. A three-facet polygon has more disadvantages than a four-facet polygon, especially when used in an optical system for generating a laser scanning pattern with the crossing angle of not more than 20 degrees. In the case where the scanning lines of the same type have the same intervals, the three-facet polygon, due to a smaller number of scanning lines, has the disadvantage of a narrower read region in view of the fact that the region in the direction of arrangement of scanning lines is narrower.

SECOND PREFERRED EMBODIMENT

Figures 3A, 3B:
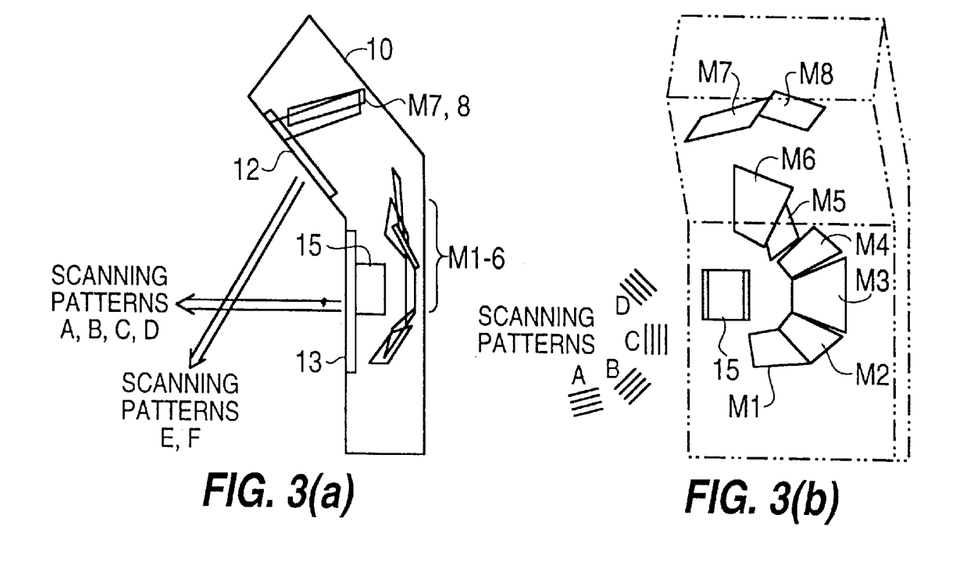
Figure 3C:
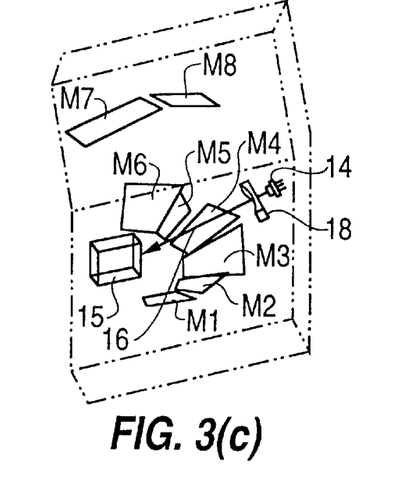
Figure 3D:
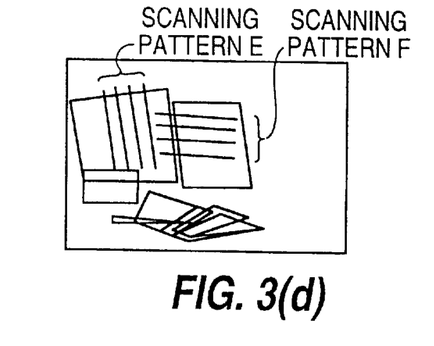

FIGS. 3(a)–(d) are diagrams showing a second embodiment of the present invention, in which FIG. 3(a) is a side cross-sectional view, FIG. 3(b) and FIG. 3(c) are front perspective views, and FIG. 3(d) shows scanning patterns on the commodity sliding surface. In the second preferred embodiment, the housing 10 is similar to that of the first embodiment. The optical scanning unit (polygon mirror) 15 is placed offset from the center of the housing 10. The laser light source 14 is placed on the side of the optical scanning unit 15. Also, the mirrors M5 through M8 are arranged as first light deflection unit and the mirrors M1 through M4 are arranged as second light deflection unit.

The operation according to second preferred embodiment of the present invention will be described below in further detail. The laser beam 16 emitted by the laser light source 14 enters the polygon mirror 15. Then the laser beam from the polygon mirror 15 scans the mirrors M1, M2, M3, M4, M5, and M6, in that order. The scanning lines split and are reflected by the mirrors M1, M2, M3, and M4, and are emitted outside the device as scanning patterns A, B, C, and D through the second reading window 13.

However, the scanning line split and reflected by the mirror M5 is reflected from mirror M7, and emitted outside the device through the first reading window 12 at the top as a scanning pattern E. At the same time the scanning line split and reflected by the mirror M6 is reflected from the mirror M8, and emitted outside the device through the first read window 12 at the top as a scanning pattern F. The configuration of the second preferred embodiment of the present invention has fewer mirrors and is less expensive than that of the first embodiment. However, in view of the fact that the laser scanning pattern is emitted only in the direction to the right in the drawing, the allowable angle of reading the commodities is narrower than that for the first embodiment.

THIRD PREFERRED EMBODIMENT

Figure 4A:
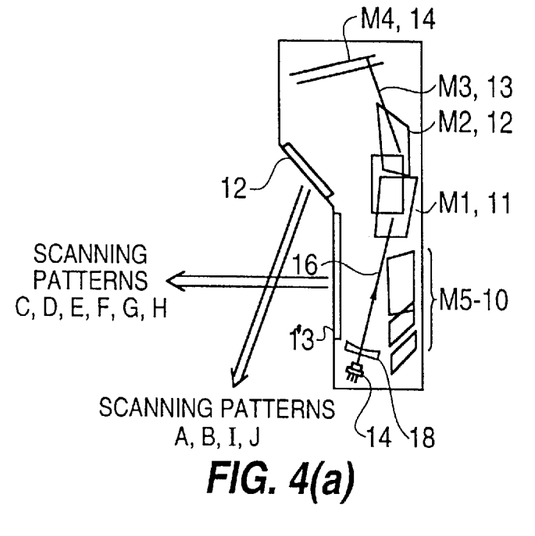
Figure 4B:
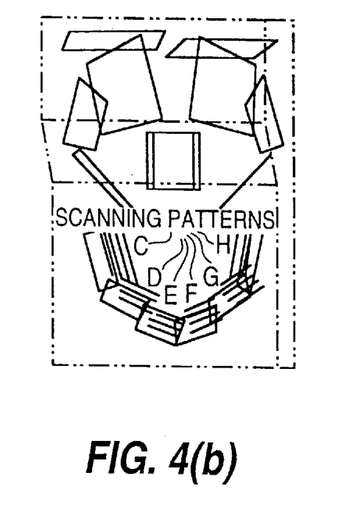
Figure 4C:
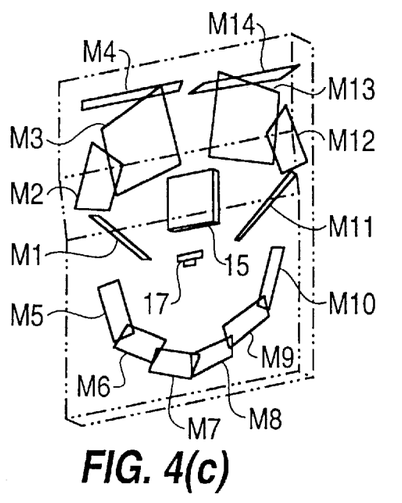
Figure 4D:
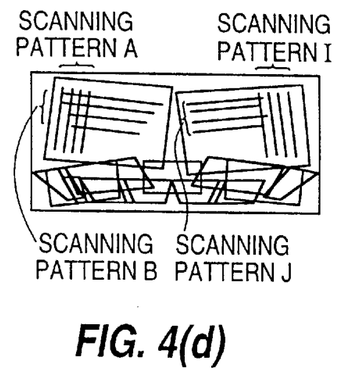

FIGS. 4(a)–(d) are diagrams showing a third preferred embodiment of the present invention, in which FIG. 4(a) is a side cross-sectional view, FIG. 4(b) and FIG. 4(c) are perspective views from the front, and FIG. 4(d) shows a scanning pattern on the commodity sliding surface. In the second preferred embodiment of the present invention, the optical scanning unit (polygon mirror) 15 is arranged at the upper portion of the apparatus and the laser light source 14 and the light sensor 17 are arranged at the lower portion thereof. Consequently, the laser beam is applied upward from the laser light source 14 toward the polygon mirror 15. Also, the mirrors M1 through M4 and the mirrors M1 through M14 are arranged as the first light deflection unit, and the mirrors M5 through M10 as the second light deflection unit.

The operation of the third preferred embodiment of the present invention will be explained in detail below. The laser beam 16 emitted by the laser light source 14 enters the polygon mirror 15. The laser beam is scanned on mirrors M1, M5, M6, M7, M8, M9, M10 and M11, in that order, by the polygon mirror 15. The scanning lines split and deflected by the mirrors M5 to M10 of the second light deflection unit are emitted outside the device as scanning patterns C, D, E, F, G, and H through the second reading window 13, on the side of the device.

However, the scanning lines split and deflected by the mirror M1 are scanned on the mirrors M2 and M3, in that order. The scanning lines reflected and split by the mirror M2 are reflected on the mirror M4 and transmitted through the first reading window 12, at the top of the device, and emitted outside the device as a scanning pattern A. The scanning line reflected on the mirror 3 is reflected on the mirror M4 and transmitted through the first reading window 12 at the top, and emitted outside as a scanning pattern B. Also, the scanning line split and deflected by the mirror M11, which is symmetric with respect to the scanning line reflected on the mirror M1, is reflected and split by the mirrors M12, M13 and M14 and emitted outside the device as scanning patterns I and J from the first reading window 12 at the top the device. The third preferred embodiment of the present invention has the function and effect similar to the first embodiment except that the optical scanning unit is arranged at the upper part of the device.

THE FOURTH AND FIFTH PREFERRED EMBODIMENTS

Figure 5A:
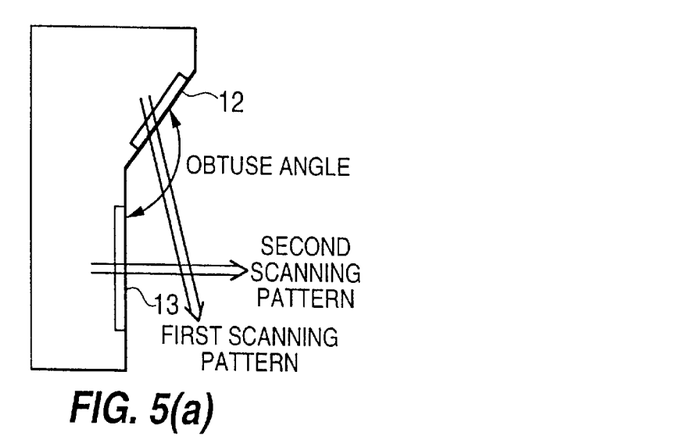
Figure 5B:
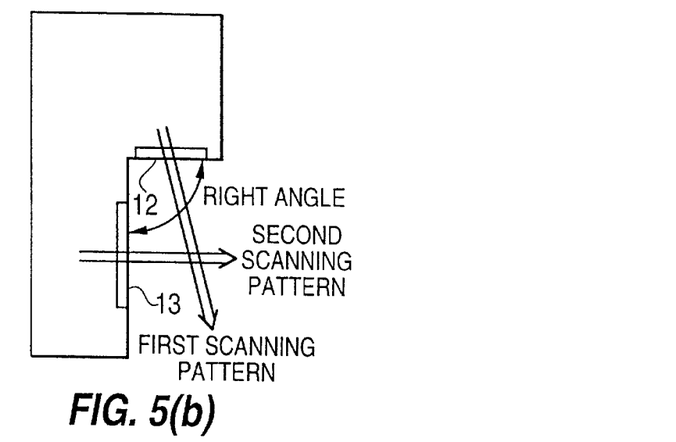
Figure 5C:
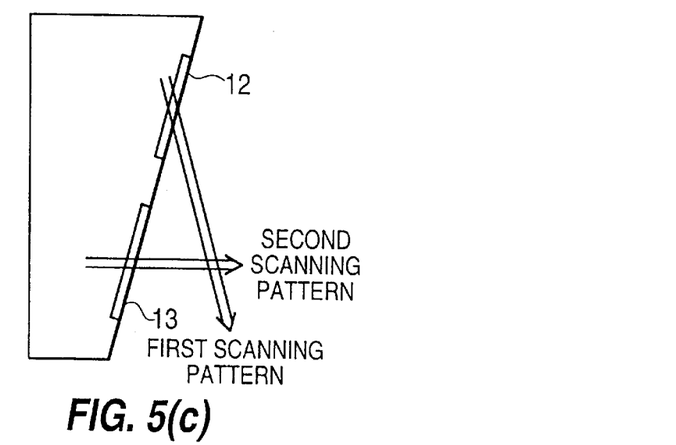

FIGS. 5(a)–(c) are diagrams showing the fourth and fifth embodiments of the present invention, in which FIG. 5(a) is a side view showing the first, second and third embodiments by way of comparison, FIG. 5(b) is a side view showing the fourth embodiment, and FIG. 5(c) is a side view showing the fifth embodiment. As shown in FIG. 5(a), according to the first, second and third embodiments, the two reading windows 12 and 13 are arranged on different surfaces, whereas according to the fourth embodiment, as shown in FIG. 5(b), the two surfaces of the adjacent two read windows 12 and 13 cross each other at right angles.

Also, according to the fifth preferred embodiment of the present invention, as shown in the diagram FIG. 5(c), the two read windows 12 and 13 are arranged in the same plane. The desired laser scanning pattern can be realized in this way by either the adjacent surfaces 12 and 13 crossing each other at right angles, as in the fourth preferred embodiment, or where they are arranged in the same plane as in the fifth preferred embodiment. Using the configurations of the fourth and fifth preferred embodiments, the reading range is wider where the two windows 12 and 13 cross each other than at an obtuse angle.

SIXTH AND SEVENTH PREFERRED EMBODIMENTS

Figure 6A:
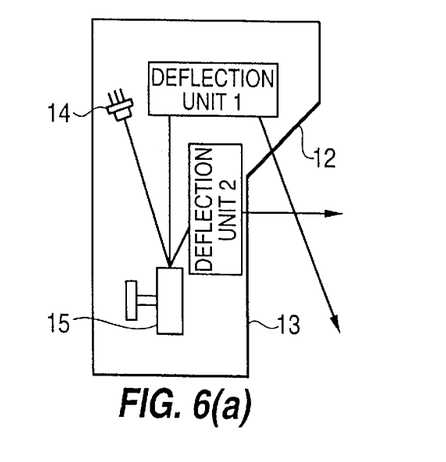
FIG. 6(a) is a side cross-sectional view of the first, second and third embodiments of the present invention.
Figure 6B:
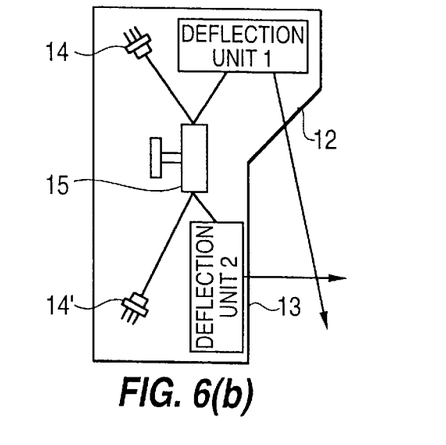
FIG. 6(b) is a side cross-sectional view of the sixth embodiment of the present invention.
Figure 6C:
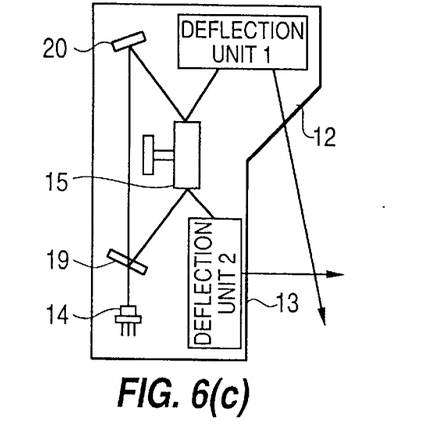
FIG. 6(c) is a side cross-sectional view of the seventh embodiment of the present invention.

FIGS. 6(a)–(c) are diagrams showing the sixth and seventh preferred embodiments of the present invention, in which FIG. 6(a) is a side view showing the first, second and third embodiments by way of comparison, FIG. 6(b) is a side view showing the sixth embodiment, and FIG. 6(c) is a side view showing the seventh embodiment. Each of the embodiments described above uses only a single laser light source as shown in the diagram FIG. 6(a). According to the sixth preferred embodiment, as shown in the diagram FIG. 6(b), a plurality of (a minimum of two) light sources 14 and 14' are used so that the light beams from the light sources 14 and 14' are introduced into the optical scanning unit 15. One of the light beams is supplied to the first reading window 12 through the first light deflection unit, and the other is supplied to the second read window 13 through the second light deflection unit.

As shown in the diagram FIG. 6(c), the seventh preferred embodiment uses the beam from a single laser light source 14 which is formed into two beams using a light beam splitting unit (for example, a beam splitter or a half mirror). One of the beams is supplied to the optical scanning unit 15 through mirror 20 and further to the first reading window 12 through the first light deflection unit. The other beam is introduced to the first reading window 15 from the light splitting unit 19 and further to the second reading window 13 via the second light deflection unit. The sixth and seventh embodiments configured in this way, though higher in cost due to added parts, can realize the desired laser scanning pattern as in each embodiment described above.

EIGHTH PREFERRED EMBODIMENT

Figure 7A:
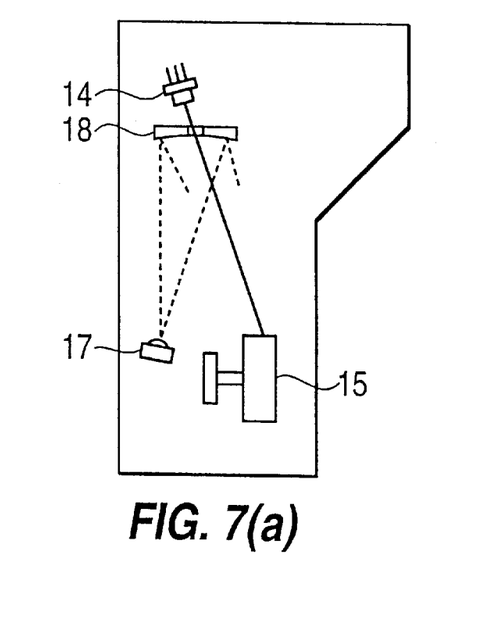
FIG. 7(a) is a side cross-sectional view of the first embodiment of the present invention.
Figure 7B:
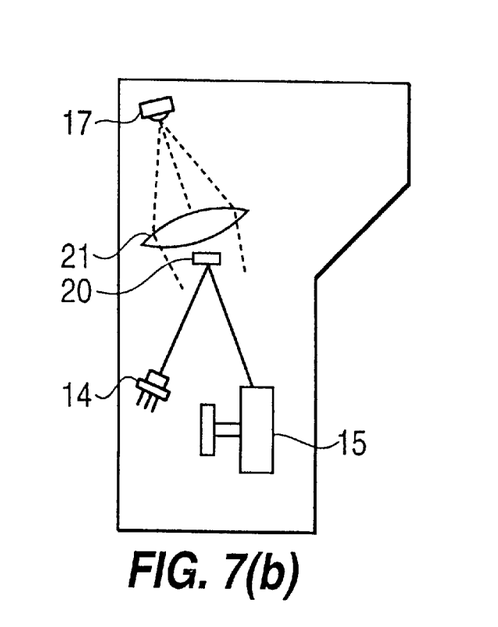
FIG. 7(b) is a side cross-sectional view of the eighth embodiment of the present invention.

FIGS. 7(a)–(b) are diagrams used to explain an eighth preferred embodiment of the invention, in which FIG. 7(a) is a side view showing the first, second and third embodiments by way of comparison, and FIG. 7(b) is a side view showing an eighth embodiment. Each of the foregoing embodiments uses a concave mirror 18 as light signal focusing unit as shown in the diagram FIG. 7(a). However, the eighth preferred embodiment, as shown in the diagram FIG. 7(b), uses a transmission-type lens (such as a Flesnel lens) 21. The concave mirror, which requires a plurality of machining steps including curving the surface and vapor deposition, is expensive. However, the transmission-type lens 21 used in the eight preferred embodiment has the advantage of a lower cost and the possibility of reducing the vertical size of the apparatus.

The optical scanning apparatus according to the present invention, described above, is inexpensive and configured in a small size. In addition, the apparatus can supply the desired laser scanning pattern to the read area from the first and second read windows. This laser scanning pattern frees the operator from the need of the scanning by tilting the commodities while at the same time making possible watching the bar code, thereby contributing to an improved efficiency of the check-out work.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical scanning apparatus mounted to a commodity sliding surface to read a bar code, comprising:

a laser light source to generate a laser beam;

an optical scanning unit rotationally driven to reflect said laser beam, said optical scanning unit being positioned at an end of said optical scanning apparatus;

a first light deflection unit to generate a first scanning pattern;

a second light deflection unit to generate a second scanning pattern;

a first reading aperture facing downward to said commodity sliding surface;

a second reading aperture facing perpendicular to said commodity sliding surface; and a light sensor unit to receive light reflected from said bar code as a result of the first and second patterns, said light sensor unit converting said light to electrical signals based on said light reflected from said bar code.

2. An optical scanning apparatus as recited in claim 1, further comprising:

the first light deflection unit directs the scanning of said optical scanning unit to said first reading aperture; and the second light deflection unit directs the scanning of said second reading aperture.

3. An optical scanning apparatus as recited in claim 1, wherein said laser light source is a single laser light source.

4. An optical scanning apparatus as recited in claim 1, wherein said optical scanning unit scans in a direction substantially perpendicular to the rotational axis of said optical scanning unit.

5. An optical scanning apparatus as recited in claim 1, wherein said optical scanning unit scans in a direction substantially parallel to said first reading aperture.

6. An optical scanning apparatus as recited in claim 1, wherein a single laser beam enters said optical scanning unit.

7. An optical scanning apparatus as recited in claim 1, wherein said light sensor unit is a single unit.

8. An optical scanning apparatus as recited in claim 1, wherein said first reading aperture and said second reading aperture are positioned in a single plane of a housing enclosing said optical scanning apparatus.

9. An optical scanning apparatus as recited in claim 1, wherein said first reading aperture and said second reading aperture are positioned in adjacent surfaces of a housing enclosing said optical scanning apparatus.

10. An optical scanning apparatus as recited in claim 8, wherein said single plane in which said first reading aperture and said second reading aperture is diagonally positioned to said commodity sliding surface.

11. An optical scanning apparatus as recited in claim 1, further comprises a housing having a bottom portion that may be installed horizontally on a commodity sliding surface.

12. An optical scanning apparatus as recited in claim 1, wherein said optical scanning unit emits a laser beam in a direction substantially perpendicular to a commodity sliding surface on which said optical scanning apparatus is mounted.

13. An optical scanning apparatus as recited in claim 1, wherein said optical scanning unit emits a laser beam in a direction substantially parallel to a commodity sliding surface on which said optical scanning apparatus is mounted.

14. An optical scanning apparatus to read a bar code, comprising;
   a laser light source to generate a laser beam;
   an optical scanning unit rotationally driven to reflect said laser beam, said optical scanning unit being positioned at an end of said optical scanning apparatus;
   a first light deflection unit to generate a first scanning pattern;
   a second light deflection unit to generate a second scanning pattern;
   a first reading aperture;
   a second reading aperture substantially perpendicular to said first reading aperture;
   a first laser scanning pattern emitted from said first reading aperture by said first light deflection unit in a downward direction;
   a second laser scanning pattern emitted from said second reading aperture by said second light defection unit which is substantially perpendicular to said first laser scanning pattern; and
   a light sensor unit to receive light reflected from said bar code as a result of the first and second scanning patterns said light sensor unit converting light to electrical signals based on said light reflected from said bar code.

15. An optical scanning apparatus contained in an elongated vertical housing having an upper end and a lower end which is mounted to a commodity sliding surface to read a bar code, comprising:
   a laser light source to generate a laser beam;
   an optical scanning unit rotationally driven by a drive motor to reflect said laser beam, wherein said optical scanning unit and said drive motor are positioned at the lower end of said elongated vertical housing to provide a low center of gravity;
   a first light deflection unit disposed at the upper end of the elongated vertical housing to generate a first scanning apparatus;
   a second light deflection unit to generate a second scanning pattern, said first and second deflection units being partially arranged around said optical scanning unit;
   a first reading aperture defined in the upper end of said elongated vertical housing in which a first reflected light is made incident;
   a second reading aperture defined in said elongated vertical housing in which a second reflected light is made incident; and
   a light sensor unit to receive the first and second reflected lights reflected from said bar code as a result of the first and second scanning patterns, said light sensor unit converting said light to electrical signals based on said light reflected from said bar code.

16. An optical scanning apparatus as recited in claim 1, further comprising:
   a first laser scanning pattern emitted from said first reading aperture by said first light deflection unit in a downward direction perpendicular or diagonal to said commodity sliding surface; and
   a second laser scanning pattern emitted from said second reading aperture by said second light deflection unit in a direction substantially parallel to said commodity sliding surface.

17. An optical scanning apparatus as recited in claim 16, wherein said second laser scanning pattern comprises a laser scanning pattern generated only by a mirror arranged in the light path leading from the optical scanning unit to said second reading aperture.

18. An optical scanning apparatus as recited in claim 16, wherein said second laser scanning pattern comprises a laser scanning pattern generated by three mirrors arranged in the light path leading from the optical scanning unit to said second reading aperture.

* * * * *

UNITED STATES PATENT AND TRADEMARK OFFICE
CERTIFICATE OF CORRECTION

PATENT NO. : 6,216,950 B1
DATED : April 17, 2001
INVENTOR(S) : Masanori Ohkawa et al.

It is certified that error appears in the above-identified patent and that said Letters Patent is hereby corrected as shown below:

<u>Title page,</u>
<u>Item [57] Abstract,</u>
Line 12, change "particular" to -- particularly --.

<u>Column 13,</u>
Line 44, change "defection" to -- deflection --;
Line 48, after "patterns" insert -- , --.

Signed and Sealed this

Sixth Day of November, 2001

Attest:

*Nicholas P. Godici*

NICHOLAS P. GODICI
*Attesting Officer*    *Acting Director of the United States Patent and Trademark Office*